United States Patent

[11] 3,619,210

[72] Inventors Gunther M. Nakel
Springfield Township, Hamilton County;
George D. Hiler, Harrison Township,
Hamilton County, both of Ohio
[21] Appl. No. 400
[22] Filed Jan. 2, 1970
[45] Patented Nov. 9, 1971
[73] Assignee The Procter & Gamble Company
Cincinnati, Ohio

[54] ORGANIC TRISULFIDE-CONTAINING CHOCOLATE FLAVOR COMPOSITIONS
10 Claims, No Drawings
[52] U.S. Cl. .................................................. 99/140 R, 99/23
[51] Int. Cl. .................................................. A23l 1/22, A23g 1/00
[50] Field of Search .......................................... 99/140 R, 23

[56] References Cited
UNITED STATES PATENTS
3,523,975 8/1970 Evers et al. .................. 99/140

Primary Examiner—Morris O. Wolk
Assistant Examiner—Warren Bovee
Attorney—Jack D. Schaeffer ABSTRACT: Novel compositions of matter possessing a chocolatelike flavor and aroma, consisting essentially of a blend of certain sulfides, particularly certain organic trisulfides pyrazines, phenols and aldehydes in the appropriate percentages, the ratio of sulfur to nonsulfur compounds preferably being about 1:3500. Examples are given for a variety of preferred food products in which such novel compositions can be used to impart a chocolatelike flavor and aroma or to enhance a chocolate flavor and aroma already present.

ORGANIC TRISULFIDE-CONTAINING CHOCOLATE FLAVOR COMPOSITIONS

BACKGROUND OF THE INVENTION

The invention relates to novel flavor compositions having a desirable chocolatelike flavor and aroma.

Chocolate is one of the most popular flavors consumed by the public today. However, for various health, dietary and economic reasons an increasing segment of the consumer market consists of chocolate products containing "artificial" chocolate flavors.

Artificial cocoa or chocolate flavors and enhancers are currently available on the market. However, these flavors contain in part natural cocoa or chocolate products deriving their characteristics chocolate flavor from these natural producers, or they contain no natural cocoa products and have a flavor in the direction of caramel rather than a true chocolatelike flavor and aroma.

Until now, no artificial flavor has been compounded with the actual flavor characteristics of chocolate. Further, no single component can be found which by itself exhibits a true chocolate aroma which may be recognized by the average person as being chocolate.

SUMMARY OF THE INVENTION

It has been suprisingly found that when certain compounds possessing no chocolatelike flavor or aroma by themselves are blended in the appropriate percentages, a desirable chocolatelike flavor and aroma results.

More specifically, it has been found that when certain sulfides are blended with a mixture of certain pyrazines, phenols and aldehydes in the appropriate percentages, the ratio of sulfur to nonsulfur compounds preferably being about 1:3500 that a desirable chocolatelike flavor and aroma is produced. Further, it has been found that a desirable chocolatelike flavor and aroma is present when certain sulfides are blended in the appropriate amounts with at least two compounds, each of the two compounds selected from a different class of compounds, said classes consisting of certain pyrazines, phenols, and aldehydes, the ratio of sulfur to nonsulfur compounds being from about 1:200 to about 1:10,000 . However, the preferred flavor and aroma result when the composition consists essentially of a compound from each of the four general classes described above, blended in the appropriate percentages and ratios.

THE PRIOR ART

The use of sulfides, pyrazines, phenols and aldehydes as flavor agents is not new to the art. U.S. Pat. No. 3,459,556 discloses flavoring compositions and methods of improving the flavor of cocoa or chocolate-flavored material using pyrazine derivatives and a carbonyl compound. A preferred embodiment of this invention is the combination of a pyrazine, preferably tetramethyl pyrazine with a carbonyl such as vanillin or an aliphatic aldehyde such as isovaleraldehyde or isobutyl aldehyde, the pyrazine derivative improving the flavor of said carbonyl compound.

However, the flavor resulting from such combinations although possessing a chocolate note, is not a true chocolate flavor possessing the true characteristics of chocolate and does not have significantly better flavor and aroma qualities that the multitude of "artificial" chocolate compositions currently available.

Other prior art including British Pat. Nos. 1,156,484, 1,156,487, 1,156,488 and Swiss Pat. No. 543,069 suggest that various sulfides, phenols, pyrazines and aldehydes can be blended together to yield a flavor, no mention being made of any particular embodiments, or specific flavors.

Therefore, it is an object of the present invention to provide novel flavor compositions which are highly desirable in that they possess true chocolatelike flavor and aroma characteristics, recognizable by the average person.

It is a further object of the present invention to provide novel flavor compositions that are desirable for health, dietary and economic reasons, said compositions possessing desirable chocolatelike flavor and aroma characteristics.

It is still another object of the present invention to provide novel flavor compositions possessing true chocolatelike flavor and aroma characteristics that can be used to impart a desirable chocolatelike flavor and aroma to food products such as cakes, icings, candy, puddings, and beverages.

It is still another object of the present invention to provide novel flavor compositions that can be used as flavor enhancers and/or fortifiers for food products such as described above, where a chocolate flavor is already present, being supplied by chocolate or cocoa.

DETAILED DESCRIPTION OF THE INVENTION

The present invention consists of a chocolate flavor composition comprising from about 0.01 to about 0.10 percent most preferably 0.03 percent of a sulfide compound having the general formula I I  $R_1-S-S-S-R_2$ wherein $R_1$ and $R_2$ are each selected from a group consisting of a straight chain alkyl group containing from about one to about 10 carbon atoms; an aralkyl containing from about five to about 10 carbon atoms (e.g., furfuryl, benzyl); and an aryl (e.g., phenyl); $R_1$ and $R_2$ being the same or different, most preferably both being methyl; and from 99.90 percent to 99.99 percent by weight of a mixture of two or three compounds, each of said compounds being selected from a different one of the following groups: from about 0 percent to about 98 percent preferably from about 90 percent to about 95 percent, most preferably 93 percent of a pyrazine compound having the general formula II II 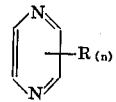

wherein $R_{(n)}$ is selected from a group consisting of hydrogen, a short chain alkyl containing from about one to about four carbon atoms; and a carbonyl containing from about one to about three carbon atoms, (e.g., acetyl, propionyl); (n) having a positive value of from about one to about four, most preferably two; R being the same or different, most preferably methyl; from about 0 percent to about 70 percent, preferably about 2 percent to about 10 percent, most preferably 4 percent of a phenol compound having the structural formula III III 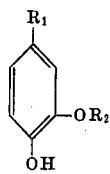

wherein $R_1$ is selected from a group consisting of an oxo group containing from about one to about three carbon atoms, (e.g., formyl, aceto, propenyl aldehyde); an unsaturated aliphatic group containing from about one to about three carbon atoms, (e.g., propenyl); and an alkyl group containing from about one to about five carbon atoms; $R_1$ most preferably being a formyl group containing one carbon atom; and $R_2$ is selected from a group consisting of a short chain alkyl containing from one to three carbon atoms, most preferably ethyl; from about 0 percent to about 45 percent, preferably from about 1 percent to about 5 percent, most preferably 3 percent of an aldehyde compound having the general structural formula IV IV 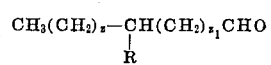

wherein R is selected from a group consisting of a straight chain alkyl containing from one to three carbon atoms, most preferably methyl, Z having a positive value of from about zero to about four, most preferably zero; $Z_1$ having a positive value of from about zero to about four, most preferably one.

Moreover, it has been suprisingly found that the presence of a preferred sulfide compound of formula (I) of the present invention when blended with the other preferred compounds of the present invention as heretofore described is essential for the production of a chocolate flavor composition possessing true chocolatelike flavor and aroma characteristics. Further, it has been suprisingly found that only a very small amount of said sulfide compound is necessary to achieve such a desirable flavor. More specifically, it has been found that a highly desirable chocolate flavor results when the ratio of the sulfide compound to nonsulfur compounds is from about 1:200 to about 1:10,000, most preferably about 1:3500. Deviations from this range result in either a significantly less desirable flavor not having a true chocolatelike flavor and aroma if too little is used; or a "strong" flavor and aroma having the characteristic taste and aroma of sulfur if too much sulfide compound is used.

Specific examples of preferred compounds of formula I are:
a. dimethyltrisulfide
b. diethyltrisulfide
c. methylethyltrisulfide
d. furfuryltrisulfide More specifically, the most preferred compound of formula I is dimethyltrisulfide.

Specific examples of preferred compounds of formula II are:
a. 2,6-dimethylpyrazine
b. methylpyrazine
c. acetylpyrazine
d. 2,5-dimethylpyrazine
e. methylpyrazinoate More specifically, the most preferred compound of formula II is 2,6-dimethylpyrazine.

Specific examples of preferred compounds of formula III are:
a. ethylvanillin
b. vanillin
c. vanitrope
d. vanillyl alcohol More specifically, the most preferred compound of formula III is ethylvanillin.

Specific examples of preferred compounds of formula IV are:
a. isovaleraldehyde (3-methylbutanal)
b. 2-methylbutanal
c. 2-methylpropanal
d. decanal More specifically, the most preferred compound of formula IV is isovaleraldehyde, (3-methylbutanal).

As discussed heretofore, the preferred compounds of this invention are not new to to the art, and their preparations are well known.

Dimethyltrisulfide (formula I) is prepared by reacting a mixture of methylmercaptan and methylene chloride with a slurry containing sulfur, n-propylamine as a catalyst and methylene chloride for a sufficient amount of time. Excess sulfur is filtered off, leaving a sufficiently pure dimethyltrisulfide.

2,6-dimethylpyrazine (formula II) is generally prepared together with other alkylpyrazines by heating glucose in a 25 percent aqueous ammonia solution 100° C.

Ethylvanillin (formula III) is prepared by reacting catechol-monoethylether with chloroform and sodium hydroxide and separating the product from the isomeric 2-hydroxy-3-ethoxybenzaldehyde by distillation with suspended steam.

Isovaleraldehyde (formula IV) is prepared by conducting the vapor of isoamyl alcohol over finely divided copper at 240°–300° C.

All of the above compounds are readily commercially available except dimethyltrisulfide which can be prepared as noted above.

The compositions of the present invention can be used to supply a chocolatelike flavor and aroma to various food products, or to enhance the flavor already supplied by chocolate of cocoa.

It has also been found that the compositions of the present invention can be used alone, or in combination with various flavor additives and enhancers, such as furfural, phenylacetaldehyde and mixtures of certain pyrazines. The use of these other compounds is optional and does not contribute to the basic chocolatelike flavor and aroma of the present invention, other than to enhance or compliment this basic flavor depending on the food product in question.

The following examples (1–4) will illustrate the preferred compositions of the present invention and their preparation. Further examples (5–7) will illustrate their desirable chocolate flavor characteristics and their use in various preferred food products. It will be understood that the invention is not confined to the specific limitations set forth in the following examples, but rather to the scope of the appended claims.

EXAMPLE I

A composition of matter consisting essentially of dimethyltrisulfide, 2,6-dimethylpyrazine, ethylvanillin, isovaleraldehyde and its preparation.

A preferred composition of the present invention consists of blending together 0.028 percent of dimethyltrisulfide (formula I), 93.161 percent of 2,6-diemthylpyrazine (formula II), 4.008 percent of ethylvanillin (formula III), and 2.803 percent of isovaleraldehyde (formula IV). The above percentages are by weight.

Said composition was prepared by adding and intimately mixing one part of dimethyltrisulfide into a mixture of 3,324 parts of 2,6-dimethylpyrazine, 143 parts of ethylvanillin and 100 parts of isovaleraldehyde. The mixture was left standing in a closed container for about 3 hours for the purpose of aging. The result was a flavor composition having a highly desirable chocolatelike flavor and aroma.

EXAMPLE II

A composition of matter consisting essentially of dimethyltrisulfide, 2,6-dimethylpyrazine, ethylvanillin and its preparation.

Another preferred composition of the present invention consisting of the blending together of .029 percent of dimethyltrisulfide (formula I), 95.84 percent of 2,6-dimethylpyrazine (formula II), and 4.124 percent of ethylvanillin (formula III), was prepared by adding 0.85 microliters of dimethyltrisulfide (equivalent to 1 milligram at a specific gravity of 1.18) to a mixture of 3,506 microliters of 2,6-dimethylpyrazine (equivalent to 3,324 milligrams at a specific gravity of .948) and 143 milligrams of ethylvanillin, and mixing the resulting mixture thoroughly, thereafter letting the mixture "age" for about 3 hours in a closed container, prior to its use. The resultant flavor composition has a desirable chocolatelike flavor and aroma.

EXAMPLE III

A composition of matter consisting essentially of dimethyltrisulfide, 2,6-dimethylpyrazine, isovaleraldehyde and its preparation.

Still another preferred composition of the present invention consists of the blending together of 0.03 percent of dimethyltrisulfide (formula I), 97.05 percent of 2,6-dimethylpyrazine (formula II), and 2.92 percent of isovaleraldehyde (formula IV).

The above composition was prepared as follows: three solutions were first prepared; Solution 1 was prepared by dissolving 10 microliters of dimethyltrisulfide (equivalent to 11.8 milligrams) in ethanol to make a total volume of 10 milliliters.

Solution II was prepared by dissolving 10 grams of 2,6-dimethylpyrazine in ethanol to make a total volume of 100 milliliters. Solution III was prepared by diluting 10 milliliters of isovaleraldehyde (equivalent to 7.84 grams) with sufficient ethanol to make a volume of 100 milliliters.

Four microliters of solution I, 156 microliters of solution II, and 6 microliters of solution III were measured into 4 milliliters of water using 10 and 250 ml. Hamilton microliter syringes. The resulting composition was a flavor having a highly desirable chocolatelike flavor and aroma.

EXAMPLE IV

A composition of matter consisting essentially of diemthyltrisulfide, ethylvanillin, isovaleraldehyde and its preparation.

Still another preferred composition of the present invention consists of the blending together of 0.10 percent of dimethyltrisulfide (formula I), 58.84 percent of ethylvanillin (formula III) and 41.06 percent of isovaleraldehyde (formula IV). The above percentages are by weight.

The above composition was prepared as follows: A solution (IV) was prepared by dissolving 1 gram of ethylvanillin in enough ethanol to make 100 ml. 67 microliters of this solution was thoroughly mixed with 1 microliter of solution I and 6 microliters of solution III of example III. The resultant mixture was pipetted into 4 milliliters of water. The result was a flavor composition possessing a desirable chocolatelike flavor and aroma.

Example V

Use of a flavor composition consisting essentially of 0.03 percent of dimethyltrisulfide, 93.12 percent of 2,6-dimethylpyrazine, 4.03 percent of ethylvanillin and 2.82 percent of isovaleraldehyde to supply a chocolatelike flavor and aroma to a yellow cake mixture.

A yellow cake dry mix was prepared having the following composition:

| Ingredient | % by weight |
| --- | --- |
| Flour (soft wheat cake flour including 0.5% by weight high-protein wheat flour) | 38.18 |
| Sugar (industrial fine granulated sucrose and dextrose) | 39.30 |
| Shortening[1] | 11.00 |
| Sodium bicarbonate | 2.45 |
| Sodium aluminum phosphate | 0.70 |
| Nonfat milk solids | 1.00 |
| Carboxymethyl cellulose | 0.20 |
| Salt | 1.00 |
| Flavor | 0.16 |
| Butterlike flavor | 6.01 |

[1] The shortening was prepared by melting together the following and plasticizing by rapidly cooling with agitation (percentages are by weight): 80% vegetable oil shortening comprising about 80% soybean oil and 20% cottonseed oil, which have been refined, bleached, deodorized and hydrogenated to an iodine value of about 60; 14.0% α-phase crystal tending emulsifiers comprised of 10% propylene glycol monostearate and 4 rapeseed glyceride; 0.25% high-temperature batter stabilizer comprised of stearic acid; and 5.75% propylene glycol distearate (an inert byproduct from propylene glycol monostearate preparation).

The mix was prepared by blending together thoroughly the flour, sugar and shortening in a paddle mixer, and then passing the blend through a roller mill. After the milling step, the remaining ingredients were added, and the resulting mixture was processed in an entoleter.

Batter was then made by adding three whole eggs and 1.33 cups of water to 19 ounces of the mix. To this batter was added 0.16 percent by weight of the dry mix in the batter of a flavor composition consisting of 0.03 percent of dimethyltrisulfide, 93.12 percent of 2,6-dimethylpyrazine, 4.03 percent of ethylvanillin and 2.82 percent of isovaleraldehyde, said composition mixed in a dispersion of dextrose, providing in the batter 1,600 p.p.m. based on the weight of the dry mix in the batter. The batter was then mixed in a conventional household electric mixer for 3 minutes at a high speed (875 r.p.m.) and for 1 minute at a medium speed (450 r.p.m.). A nine-inch cake pan was filled with 492 grams of batter and baked at 350° F. for 32 minutes.

The resulting yellow cake had a desirable chocolatelike flavor and aroma that was difficult to distinguish from a natural cocoa flavor.

Yellow cakes were prepared the same as above except that in place of the above composition, 0.16 percent by weight of the dry mix of a composition consisting of 0.029 percent of dimethyltrisulfide, 95.847 percent of 2,6-dimethylpyrazine and 4.124 percent of ethylvanillin was added in a dextrose dispersion to provide 1,532 p.p.m. of flavor based on the weight of the dry mix in the batter. 0.16 percent by weight of dry mix of a composition consisting of 0.03 percent of dimethyltrisulfide, 97.05 percent of 2,6-dimethylpyrazine, and 2.92 percent of isovaleraldehyde, mixed in a dextrose dispersion providing 1,508 p.p.m. based on the weight of the dry mix was added to the batter described above, in place of the above described flavor compositions. Further, a similar yellow cake was prepared using the above described cake mix, but substituting in place of the above-described flavor compositions 0.01 percent by weight of the dry mix a flavor composition consisting of 0.10 percent of dimethyltrisulfide, 58.84 percent of ethylvanillin, and 41.06 percent of isovaleraldehyde, said composition added to the cake batter in a dextrose dispersion providing 100 p.p.m. of flavor composition based in the weight of the dry mix in the batter.

The resulting cakes all had a desirable chocolatelike flavor and aroma comparing favorably with natural cocoa flavors.

Similar results of a highly desirable chocolatelike flavor and aroma were obtained when yellow cakes were made containing the compositions of this invention plus optional additional flavor agents such as furfural, phenylacetaldehyde, and certain pyrazines to further enhance the basic flavor of this invention.

EXAMPLE VI

Use of a composition consisting essentially of 0.02 percent of dimethyltrisulfide, 96.00 percent of 2,6-dimethylpyrazine, 1.58 percent of ethylvanillin and 2.40 percent of isovaleraldehyde to supply a chocolatelike flavor and aroma to an icing.

An icing was prepared having the following composition:

| Ingredients | % by Weight |
| --- | --- |
| Confectioner's sugar | 66.30 |
| Sodium chloride | 0.39 |
| Nonfat milk solids | 4.16 |
| Shortening[1] | 17.42 |
| Flavor composition | 0.03 |
| Water | 11.70 |

[1] The shortening is prepared by melting together the following and plasticizing by rapidly cooling with agitation (percentages are by weight). 63% Base stock (refined, bleached soybean oil partially hydrogenated to an iodine value of about 85 and a solids content index of 11 at 70° F. 30% Hard stock (substantially completely hydrogenated soybean oil having an iodine value of 8) 4% Mono- and diglycerides of partially hydrogenated soybean oil having an iodine value of about 80.

The dry ingredients were blended in a small bowl on a Hobart Mixer for 5 minutes at speed 01. Included in this mixture was 0.03 percent based on the weight of the dry mixture of a flavor composition consisting essentially of 0.02 percent of dimethyltrisulfide, 96.00 percent of 2,6-dimethylpyrazine, 1.58 percent of ethylvanillin, and 2.40 percent of isovaleraldehyde in sucrose to provide to the mixture 300 p.p.m. based on the weight of the dry mixture. The shortening and water where then added and mixed for 10 minutes at speed 01, scraping every 00-1/2 minutes. the ingredients were then beat at speed 02 for 10 minutes scraping every 2½ minutes.

The resulting icing had a desirable chocolatelike flavor and aroma comparing favorably with natural chocolate products.

Similar desirable results are also obtained when additional flavor agents such as furfural phenylacetaldehyde and certain pyrazines are added to the above composition to further enhance the basic chocolate flavor.

EXAMPLE VII

Use of a composition consisting essentially of 0.029 percent of dimethyltrisulfide, 95.847 percent of 2,6-dimethylpyrazine, 4.124 percent of ethylvanillin to supply a chocolatelike flavor and aroma to a beverage.

A beverage was prepared having the following composition:

| Ingredients | % by weight |
|---|---|
| Whole cow's milk | 99.972 |
| Flavor | 0.028 |

100 grams of whole cow's milk was poured into a container to which was added 0.028 percent of a flavor composition by weight of the total mixture, said composition consisting of 0.029 percent of dimethyltrisulfide, 95.847 percent of 2,6-dimethylprazine and 4.124 percent of ethylvanillin. This provides the mixture with about 280 p.p.m. of active flavor composition.

The result was a white milk that has a desirable and easily recognizable chocolatelike flavor and aroma. Additional F&D certified chocolate food colors can be added to give the mixture a characteristic brown color.

Optional flavor enhancers such as furfural, phenylacetaldehyde and certain pyrazines can be added to further enhance the basic desirable chocolatelike flavor and aroma produced by the present invention.

The result in each case was a white milk having a highly desirable chocolatelike flavor and aroma.

We claim:

1. A synthetic chocolate flavor comprising (A) from 0.01 percent to 0.10 percent by weight of a sulfide having the formula (I)

$$R_1-S-S-S-R_2$$

wherein $R_1$ and $R_2$ are each selected from a group consisting of a straight chain alkyl group having from about one to about 10 carbon atoms; an aralkyl containing from about five to about 10 carbon atoms; and phenyl; and (B) from 99.90 percent to 99.99 percent by weight of a mixture of two or three compounds each of said compounds selected from a different one of the following groups: a pyrazine compound having the formula II II 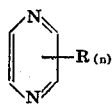

wherein $R_{(n)}$ is selected from a group consisting of hydrogen, a short chain alkyl containing from about one to about four carbon atoms; and a carbonyl containing from one to three carbon atoms; $n$ having a positive value of from one to four R being the same or different.

a phenol compound having the formula III

III 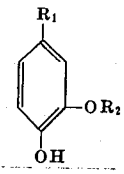

wherein $R_1$ is selected from a group consisting of an oxo group containing from about one to about three carbon atoms; an unsaturated aliphatic group containing from about one to about three carbon atoms; and an alkyl containing from about one to about five carbon atoms; and $R_2$ is selected from a group consisting of a short chain alkyl containing from about one to about three carbon atoms;

an aldehyde compound having the formula IV

IV $$CH_3(CH_2)_z-\underset{R}{CH}(CH_2)_{z_1}CHO$$

wherein R is selected from a group consisting of a straight chain alkyl containing from about one to about three carbon atoms; Z having a positive value of from about zero to about four; $Z_1$ having a positive value of from about zero to about four.

2. A composition of claim 1, wherein the ratio of sulfur compound (A) to nonsulfur compounds (B) is a ratio of from about 1:200 to about 1:10,000.

3. A composition of claim 1, wherein the ratio of sulfur compound (A) to nonsulfur compounds (B) is a ratio of about 1:3500.

4. A composition of claim 1 consisting essentially of from about 0.01 percent to about 0.05 percent of a formula I compound; from about 90 percent to about 95 percent of a formula II compound; from about 2 percent to about 10 percent of a formula III compound; and from about 1 percent to about 5 percent of a formula IV compound.

5. A composition of claim 1 wherein formula I, $R_1$ and $R_2$ are methyl.

6. A composition of claim 1 wherein formula II, R is methyl and $n$ has a positive value of two.

7. A composition of claim 1 wherein a compound of formula II is 2,6-dimethylpyrazine.

8. A composition of claim 1 wherein formula III, $R_1$ is formyl and $R_2$ is ethyl.

9. A composition of claim 1 wherein formula IV, R is methyl; Z has a value of zero; and $Z_1$ has a value of one.

10. A food product to which has been added the composition of claim 4.

* * * * *

PO-1050
(5/69)

UNITED STATES PATENT OFFICE
CERTIFICATE OF CORRECTION

Patent No. 3,619,210          Dated November 9, 1971

Inventor(s) Gunther M. Nakel and George D. Hiler

It is certified that error appears in the above-identified patent and that said Letters Patent are hereby corrected as shown below:

In the ABSTRACT, line 4, after "fides" should read ---,---.
Column 1, line 16, "characteristics" should read ---characteristic-
Column 1, line 16, "producers" should read ---products---.
Column 1, line 27, "suprisingly" should read ---surprisingly---.
Column 2, line 19, after "percent" should read ---,---.
Column 2, line 31, after the second "percent" should read ---,---.

Column 3, line 7, "suprisingly" should read ---surprisingly---.
Column 3, line 14, "suprisingly" should read ---surprisingly---.
Column 3, line 68, after "solution" should read ---to---.
Column 3, line 72, "suspended" should read ---superheated---.
Column 4, line 7, "of" should read ---or---.
Column 4, line 14, "chocolatelike" should read ---chocolate---.
Column 4, line 31, "2,6-diemthylpyrazine" should read ---2,6-dimethylpyrazine---.
Column 4, line 50, "95.84" should read ---95.847---.
Column 5, line 57, after "4" should read ---%---.
Column 6, line 60, "01" should read ---#1---.
Column 6, line 67, "01" should read ---#1---.
Column 6, line 68, "00-1/2" should read ---2-1/2---.
Column 6, line 69, "02" should read ---#2---.
Column 7, line 43, after "compounds" should read ---,---.
Column 8, line 2, after "four" should read ---;---.
Column 8, line 44, "wherein" should read ---where in---.
Column 8, line 46, "wherein" should read ---where in---.
Column 8, line 50, "wherein" should read ---where in---.
Column 8, line 52, "wherein" should read ---where in---.

Signed and sealed this 6th day of June 1972.

(SEAL)
Attest:

EDWARD M. FLETCHER, JR.
Attesting Officer

ROBERT GOTTSCHALK
Commissioner of Patents